United States Patent
Zhang (10) Patent No.: US 11,503,193 B2
(45) Date of Patent: Nov. 15, 2022

(54) IMAGING MODULE, CAMERA ASSEMBLY AND ELECTRONIC DEVICE

(71) Applicant: GUANGDONG OPPO MOBILE TELECOMMUNICATIONS CORP., LTD., Guangdong (CN)

(72) Inventor: Gong Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/107,017

(22) Filed: Nov. 30, 2020

(65) Prior Publication Data
US 2021/0120154 A1    Apr. 22, 2021

Related U.S. Application Data

(63) Continuation of application No. PCT/CN2019/087211, filed on May 16, 2019.

(30) Foreign Application Priority Data

Jun. 14, 2018  (CN) .......................... 201810613612.6
Jun. 14, 2018  (CN) .......................... 201820928673.7

(51) Int. Cl.
  *H04N 5/225*    (2006.01)
  *G02B 7/02*    (2021.01)
  *G03B 13/34*    (2021.01)
  *H04M 1/02*    (2006.01)

(52) U.S. Cl.
  CPC ........... *H04N 5/2254* (2013.01); *G02B 7/021* (2013.01); *G03B 13/34* (2013.01); *H04M 1/0264* (2013.01);
(Continued)

(58) Field of Classification Search
USPC .................................................. 348/345, 373
See application file for complete search history.

(56) References Cited

U.S. PATENT DOCUMENTS

2010/0124415 A1  5/2010  Cao
2011/0128639 A1*  6/2011  Honda et al. .......... G03B 13/36
                                       348/218.1
(Continued)

FOREIGN PATENT DOCUMENTS

CN   101408654 A   4/2009
CN   104980542 A   10/2015
(Continued)

OTHER PUBLICATIONS

First Office Action with English Translation from China patent office in a counterpart Chinese patent Application 201810613612.6, dated Jun. 5, 2019 (17 pages).
(Continued)

*Primary Examiner* — Xi Wang
(74) *Attorney, Agent, or Firm* — Young Basile Hanlon & MacFarlane, P.C.

(57) ABSTRACT

Disclosed is an imaging module, including a housing, a moving element received in the housing, multiple lenses in contact with and fixed on the moving element, an image sensor provided at one side of the multiple lenses, and a drive mechanism connected to the housing and the moving element, wherein the drive mechanism is used for driving the moving element to move along the optical axis of the multiple lenses so that the multiple lenses focus on the image sensor for imaging. A camera assembly and an electronic device are further disclosed.

13 Claims, 9 Drawing Sheets

(52) U.S. Cl.
CPC ...... *H04N 5/2253* (2013.01); *H04M 2250/52* (2013.01)

(56) References Cited

U.S. PATENT DOCUMENTS

| | | | |
|---|---|---|---|
| 2012/0128339 | A1 | 5/2012 | Hu |
| 2015/0288865 | A1* | 10/2015 | Osborne ................ G03B 13/36 348/218.1 |
| 2018/0024329 | A1 | 1/2018 | Goldenberg et al. |
| 2018/0109660 | A1 | 4/2018 | Yoon et al. |
| 2018/0213154 | A1* | 7/2018 | Ba-Tis ............... H04N 5/23212 |
| 2018/0343391 | A1* | 11/2018 | Goldenberg ............. G03B 3/10 |

FOREIGN PATENT DOCUMENTS

| | | |
|---|---|---|
| CN | 206039030 U | 3/2017 |
| CN | 107454302 A | 12/2017 |
| CN | 107490845 A | 12/2017 |
| CN | 207124681 U | 3/2018 |
| CN | 108535830 A | 9/2018 |
| EP | 1560054 A1 | 8/2005 |

OTHER PUBLICATIONS

Second Office Action with English Translation from China patent office in a counterpart Chinese patent Application 201810613612.6, dated Jan. 6, 2020 (11 pages).
International search report, PCT/CN2019/087211, dated Aug. 21, 2019 (2 pages).
Extended European Search Report for EP Application 19820530.4 dated Jun. 30, 2021. (7 pages).
India Examination Report for IN Application 202017048547 dated Dec. 9, 2021.

* cited by examiner

IMAGING MODULE, CAMERA ASSEMBLY AND ELECTRONIC DEVICE

CROSS-REFERENCE TO RELATED APPLICATIONS

The present application is a continuation-application of International (PCT) Patent Application No. PCT/CN2019/087211, filed on May 16, 2019, which claims priority to Chinese Patent Applications No. 201810613612.6 and 201820928673.7, both filed on Jun. 14, 2018, the entire contents of both of which are hereby incorporated by reference.

TECHNICAL FIELD

The present disclosure relates to the field of electronic devices, and in particular to an imaging module, a camera module, and an electronic device.

BACKGROUND

With the popularization of mobile phones in people's daily lives, users have put forward higher requirements on functions of the mobile phones. For example, mobile phones tend to be lighter and thinner. For example, mobile phones are required to present better a photographic effect. In the related art, a periscope lens is configured in a camera of a mobile phone, which improves the photographic effect of the mobile phone. A periscope camera can perform, for example, a triple optical focal length to obtain a higher-quality image.

SUMMARY

The application provides an imaging module, a camera assembly and an electronic device.

The imaging module according to the embodiment of the present disclosure includes: a housing; a moving element, movably received in the housing; a plurality of lenses, arranged on the moving element and movable along the moving element; an image sensor, disposed on a side of the plurality of lenses; and a drive mechanism connecting to the housing and the moving element, wherein the drive mechanism is configured to drive the moving element to move along an optical axis of the plurality of lenses such that the plurality of lenses perform focusing and imaging on the image sensor.

The camera assembly according to the embodiment of the present disclosure includes the imaging module of the foregoing embodiment. The housing defines a light inlet, and the imaging module further includes a light-converting element disposed in the housing, and the light-converting element is configured to redirect an incident light entering the imaging module from the light inlet, such that the incident light passes through the plurality of lenses and is further transmitted to the image sensor.

The electronic device according to the embodiment of the present disclosure includes a casing and the camera assembly of the foregoing embodiment, and the camera assembly is disposed on the casing. Additional aspects and advantages of the present disclosure will be given in part in the following description, part of which will become apparent from the following description, or be learned through the practice of the present disclosure.

BRIEF DESCRIPTION OF THE DRAWINGS

In order to describe the technical solutions in the embodiments of the present disclosure more clearly, the drawings illustrative of the embodiments will be briefly described below. Obviously, the drawings in the following description only represent some embodiments of the present disclosure. For those of ordinary skill in the art, other drawings may also be obtained based on these drawings without any creativity.

DETAILED DESCRIPTION

The embodiments of the present disclosure will be described in detail. Examples of the embodiments are illustrated in the accompanying drawings. Same or similar reference numerals indicate same or similar elements or an element having same or similar functions throughout. The embodiments described below with reference to the accompanying drawings are exemplary and are only for the purpose of explaining the present disclosure, and should not be construed as limiting the present disclosure.

In the description of the present disclosure, it should be understood that terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise" refer to an orientation or a positional relationship based on the orientation or positional relationship illustrated in the accompanying drawings. The terms are only for the convenience of describing the present disclosure and simplifying the description, and do not indicate or imply that the device or element referred to must have a specific orientation, or be constructed or operated in the specific orientation. Therefore, the terms cannot be understood as a limitation on this application. In addition, the terms of "first" and "second" are used for description only and cannot be understood as indicating or implying relative importance or implicitly indicating the number of the technical features indicated. Therefore, the features defined as "first" and "second" may explicitly or implicitly include one or more of the features. In the description of the present disclosure, the meaning of "a plurality" is two or more, unless it is specifically defined otherwise.

In the description of the present disclosure, it should be noted that the terms of "mount" and "connect" should be understood in a broad sense, unless explicitly stated and limited otherwise. For example, components may be fixedly connected or removably connected to each other; components may be mechanically connected, electrically connected, or communication connected to each other; components may be directly connected, or indirectly connected to each other through an intermediate medium. Connection can also be an internal communication or an interaction relationship of two elements. For those of ordinary skill in the art, specific meanings of the above terms in the present disclosure can be understood according to specific situations.

In the present disclosure, unless explicitly stated and limited otherwise, the first feature being "above" or "under" the second feature may include the first and second features being in direct contact, and may also include the first and second features being in indirect contact but in contact through another feature between the first and second features. Moreover, the first feature is "on", "above" and "on a top side of" the second feature, including that the first feature is directly above and obliquely above the second feature, or merely indicates that the first feature is higher in level than the second feature. The first feature is "under", "below", and "on a bottom side of" the second feature, including that the first feature is directly under and obliquely under the second feature, or merely indicating that a horizontal height of the first feature is less than that of the second feature.

The following disclosure provides many different embodiments or examples for implementing different structures of the present disclosure. To simplify the disclosure of the present disclosure, components and configurations of specific examples will be described. Of course, the embodiments are merely for illustrating and are not intended to limit the application. Furthermore, the present disclosure may repeat reference numbers or reference letters in different examples. Such repetition is for simplicity and clarity, and does not indicate a relationship between the various embodiments or configurations. In addition, examples of various specific processes and materials are provided in the present disclosure, but those of ordinary skill in the art may be aware of the application of other processes or the use of other materials.

According to some embodiments of the present disclosure, the imaging module 10 includes a housing 11, a moving element 12 movably received in the housing 11, a plurality of lenses 13 arranged on the moving element and movable along with the moving element 12, an image sensor 14 disposed on a side of the plurality of lenses 13, and a drive mechanism 15 connecting to the housing 11 and the moving element 12. The drive mechanism 15 is configured to drive the moving element 12 to move along an optical axis of the plurality of lenses 13 such that the plurality of lenses 13 may perform focusing and imaging on the image sensor 14.

In some embodiments, the moving element 12 has a substantially cylindrical configuration. The plurality of lenses 13 are fixed in the moving element 12 at intervals along an axial direction of the moving element 12. In some embodiments, the moving element 12 includes two clips 122. The plurality of lenses 13 are sandwiched between the two clips 122.

In some embodiments, the plurality of lenses 13 are adhered to the moving element 12 by an adhesive or by a thread.

In some embodiments, the drive mechanism 15 may be an electromagnetic drive mechanism 15, a piezoelectric drive mechanism 15, or a memory alloy drive mechanism 15.

In some embodiments, the imaging module 10 includes a light-converting element 16 disposed in the housing 11. The light-converting element 16 is configured to redirect an incident light from an outside of the housing 11 such that the light passes through the plurality of lenses 13 and is further transmitted to the image sensor 14.

In some embodiments, the moving element 12 is disposed between the light-converting element 16 and the image sensor 14 and spaced apart from the light-converting element 16 and the image sensor 14 along an optical axis of the plurality of lenses 13.

In some embodiments, the imaging module 10 includes a mounting base 17 received in the housing 11. The light-converting element 16 is fixed on the mounting base 17.

Figure 5:
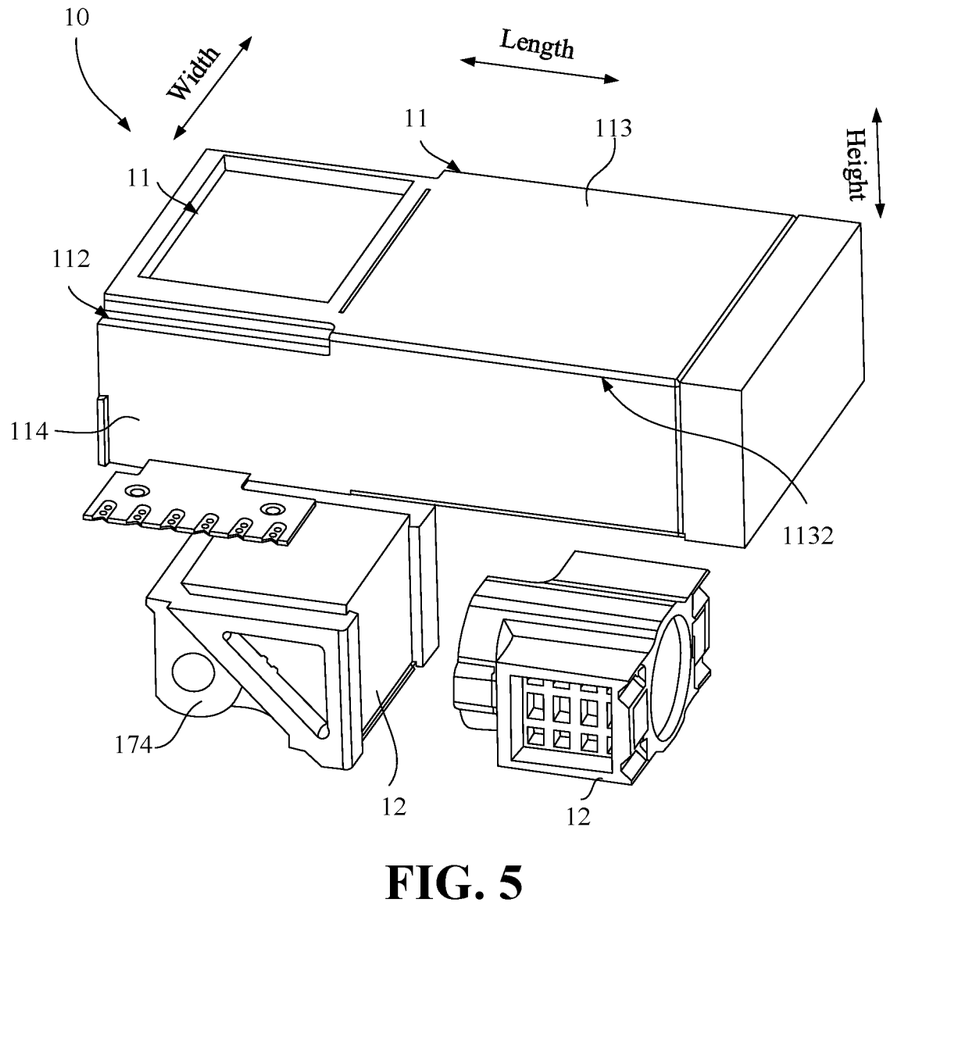
FIG. 5 is an exploded schematic view of an imaging module according to an embodiment of the present disclosure.
Figure 6:
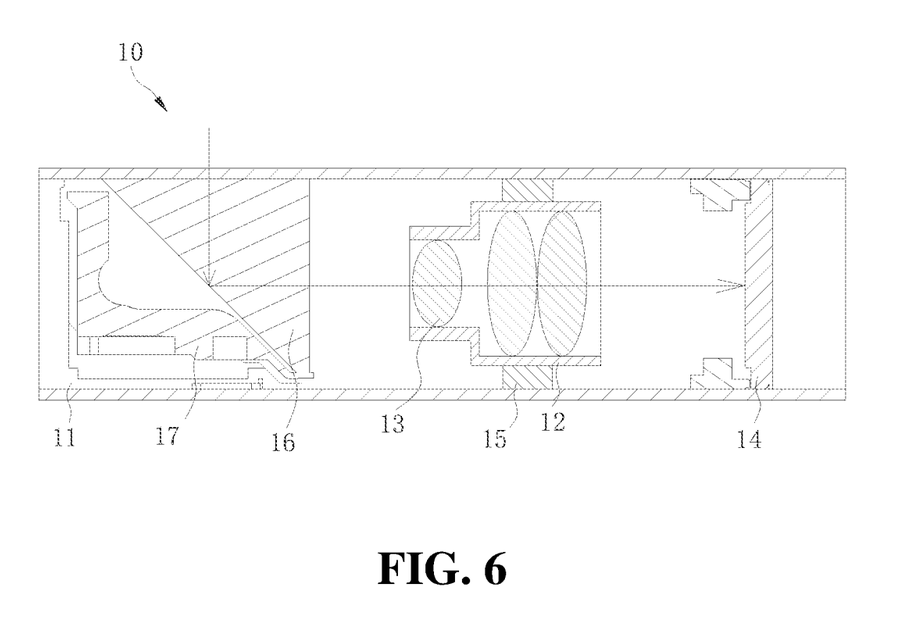
FIG. 6 is a schematic cross-sectional view of an imaging module according to an embodiment of the present disclosure.

In some embodiments, as shown in FIGS. 5-6, the mounting base 17 may include a side wall defining a receiving chamber, and the light-converting element 16 is received in the receiving chamber. The side wall may be opened at a side close to or adjacent to the moving element 12. A protrusion protrudes inwardly from the side wall in a direction towards the optical axis of the plurality of lenses 13. The light-converting element 16 may be abutted against the protrusion.

In some embodiments, as shown in FIG. 5, the mounting base 17 further includes a connection component 174 disposed at one side of the side wall away from the moving element 12, and the moving element 12 may be connected to the housing 11 via the connection component 174. In some embodiments, the moving element 12 may rotate relative to the housing 11 via the connection component 174. However, in some embodiments, the moving element 12 may also be fixedly connected to the housing 11 via the connection component 174.

In some embodiments, the mounting base 17 may be rotatable relative to the housing 11 to adjust the light-converting element 16 to redirecting the incident light, such that an optical stabilization of the imaging module 10 is realized.

In some embodiments, the light-converting element 16 includes a prism or a plane mirror.

According to some embodiments of the present disclosure, the camera assembly 100 includes a housing 11, defining a light inlet 111; a moving element 12, received in the housing 11; a plurality of lenses 13 contacting with and fixed on the moving element 12; an image sensor 14 disposed at a side of the plurality of lenses 13; a drive mechanism 15 connecting the housing 11 and the moving element 12, the drive mechanism 15 being configured to drive the moving element 12 to move along an optical axis of the plurality of lenses 13 such that the plurality of lenses perform focusing and imaging on the image sensor 14; and a light-converting element 16, disposed in the housing 11 and configured to redirect an incident light entering the imaging module from the light inlet 111, such that the incident light passes through the plurality of lenses 13 and is further transmitted to the image sensor 14.

In some embodiments, the housing 11 defines a groove 112 on a side with the light inlet 111 in a width direction of the imaging module 10. The camera assembly 100 further includes a decoration member 20. The decoration member 20 is disposed over the light inlet, and partially inserted into the groove 112. The decoration member 20 defines a through hole 21. The light inlet 111 is exposed to an outside of the imaging module through the through hole 21. The imaging module 10 collects external images through the through hole 21.

In some embodiments, the housing 11 includes a top wall 113 and a side wall 114 extending from a side edge 1132 of the top wall 113. The light inlet 111 is defined on the top wall 113. The groove 112 is defined at a junction between the top wall 113 and the side wall 114. The decoration member 20 is abutted on the top wall 113.

In some embodiments, the groove 112 has a substantially elongated configuration, and extends along a length direction of the imaging module 10. In some embodiments, the groove 112 has a substantially arc configuration, and surrounds the light inlet 111.

In some embodiments, a number of the side walls 114 is two. The top wall 113 includes two side edges 1132 opposite to each other. Each side wall 114 extends from one of the side edges 1132 correspondingly. A junction between each side wall 114 and the top wall 113 defines a groove 112.

In some embodiments, the decoration member 20 includes a decoration ring 22 and a protruding edge 23 extending from a bottom of the decoration ring 22 in a direction away from the decoration ring 22. A part of the bottom of the decoration ring 22 is received in the groove 112. A part of the decoration ring 22 is abutted on the top wall 113.

In some embodiments, an engaging portion is formed at a junction between the decoration ring 22 and the protruding edge 23 at one side facing towards the top wall 113, and the engaging portion may be engaged into the groove 112, such that a part of the bottom of the decoration ring 22 is received in the groove 112 and a part of the decoration ring 22 is abutted on the top wall 113.

In some embodiments, the camera assembly 100 further includes a bracket 30. The imaging module 10 is disposed in the bracket 30 and fixedly connected to the bracket 30.

In some embodiments, the decoration member 20 is disposed above the bracket 30 and the decoration member 20 is abutted on the bracket 30. In some embodiments, the decoration member 20 is disposed at a distance from the bracket 30.

In some embodiments, the imaging module 10 includes a mounting base 17 received in the housing 11. The light-converting element 16 is fixed on the mounting base 17.

In some embodiments, the mounting base 17 may be rotated relative to the housing 11 to adjust the light-converting element 16, thereby redirecting the incident light, such that an optical stabilization of the imaging module 10 is realized.

In some embodiments, the light-converting element 16 includes a prism or a plane mirror.

Figure 1:
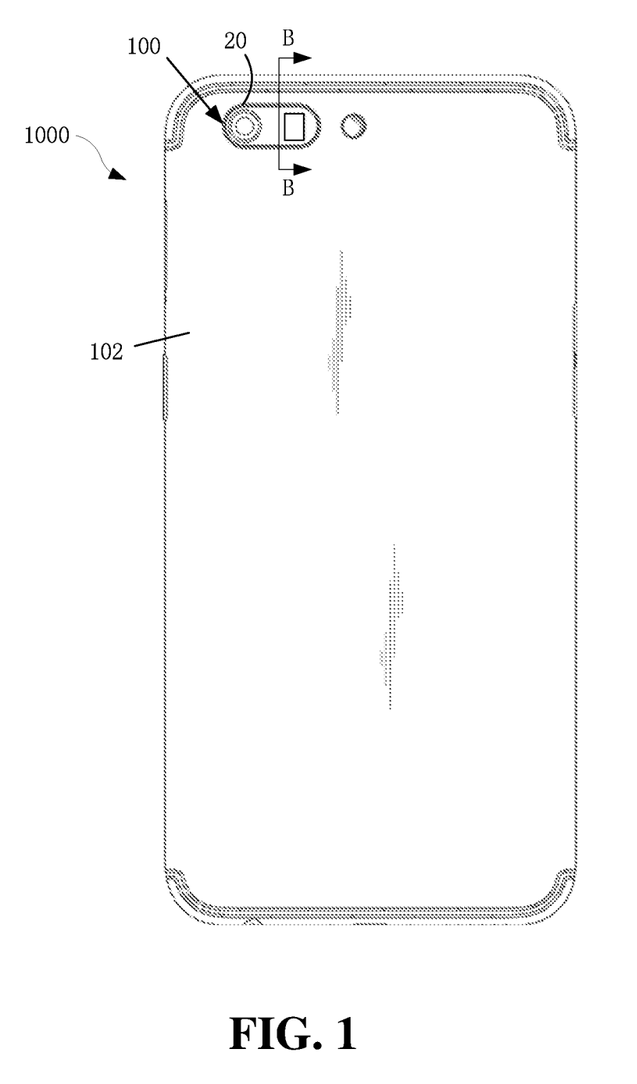
FIG. 1 is a schematic plan view of an electronic device according to an embodiment of the present disclosure.

As shown in FIG. 1, according to some embodiments of the present disclosure, an electronic device 1000 includes a casing 102 and a camera assembly 100 disposed in the casing 102. The camera assembly 100 includes a housing 11, defining a light inlet 111; a moving element 12, received in the housing 11; a plurality of lenses 13 contacting with and fixed on the moving element 12; an image sensor 14 disposed at a side of the plurality of lenses 13; a drive mechanism 15 connecting the housing 11 and the moving element 12, the drive mechanism 15 being configured to drive the moving element 12 to move along an optical axis of the plurality of lenses 13 such that the plurality of lenses perform focusing and imaging on the image sensor 14; and a light-converting element 16, disposed in the housing 11 and configured to redirect an incident light entering the imaging module from the light inlet 111, such that the incident light passes through the plurality of lenses 13 and is further transmitted to the image sensor 14.

In some embodiments, the housing 11 defines a groove 112 on a side with the light inlet 111 in a width direction of the imaging module, and the camera assembly 100 further includes a decoration member 20; the decoration member 20 is disposed over the light inlet 111, and partially inserted into the groove 112; the decoration member 20 defines a through hole 21; the light inlet 111 is exposed to an outside of the imaging module 10 through the through hole 21; the imaging module 10 collects external images through the through hole 21.

In some embodiments, the decoration member 20 includes a decoration ring 22 and a protruding edge 23 extending from a bottom of the decoration ring 22 in a direction away from the decoration ring 22; a part of the bottom of the decoration ring 22 is received in the groove 112 and abutted on the top wall 113; the protruding edge 23 is abutted on the casing 102.

The electronic device 1000 may be a mobile phone, a tablet computer, a notebook computer, a smart bracelet, a smart watch, a smart helmet, a smart glass, or the like. According to some embodiments of the present disclosure, a mobile phone is taken as an example of the electronic device 1000 for description. It can be understood that the specific form of the electronic device 1000 may be others, which is not limited herein.

Specifically, the casing 102 is an external component of the electronic device 1000 for protecting internal components of the electronic device 1000. The casing 102 may be a rear cover of the electronic device 1000 to cover components such as a battery of the electronic device 1000. In some embodiments, the camera assembly 100 is rear-mounted, that is, the camera assembly 100 is disposed on a rear side of the electronic device 1000 such that the electronic device 1000 may perform a rear-side imaging. As shown in FIG. 1, the camera assembly 100 is disposed at an upper-left corner of the casing 102. Of course, it can be understood that the camera assembly 100 may be disposed in other positions such as upper-middle or upper-right of the casing 102. The position in which the camera assembly 100 is disposed in the casing 102 is not limited to the examples of the present disclosure.

As shown in FIG. 6, an imaging module 10 according to some embodiments of the present disclosure includes a housing 11, a moving element 12 received in the housing 11, a plurality of lenses 13 contacting with and fixed on the moving element 12, an image sensor 14 disposed on a side of the plurality of lenses 13, and a drive mechanism 15 connecting to the housing 11 and the moving element 12. In some embodiments, the image sensor 14 and the plurality of lenses 13 may be disposed separately or spaced apart from each other along an optical axis of the plurality of lenses 13. The drive mechanism 15 is configured to drive the moving element 12 to move along an optical axis of the plurality of lenses 13 such that the plurality of lenses 13 perform focusing and imaging on the image sensor 14.

Figure 9:
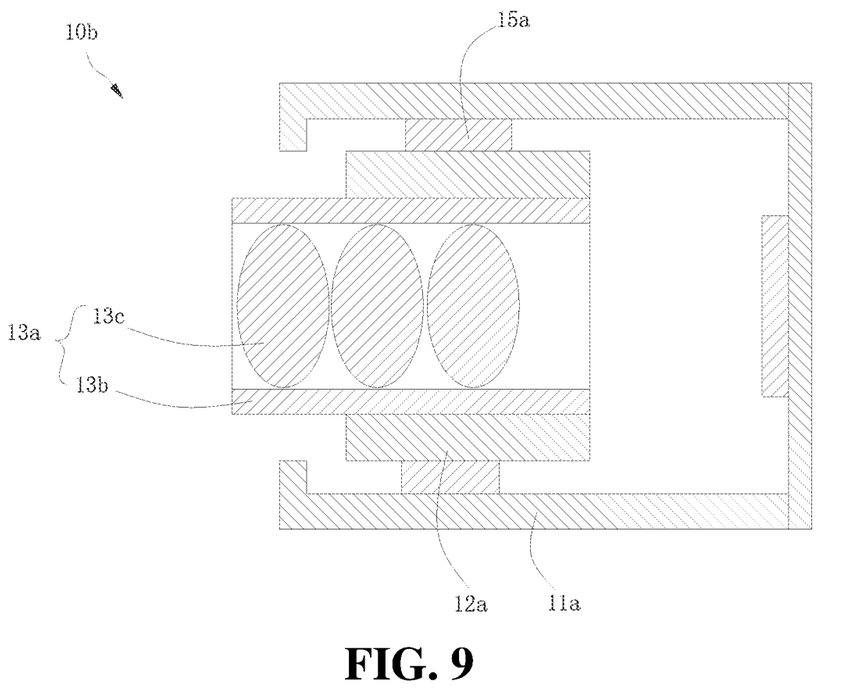
FIG. 9 is a schematic cross-sectional view of an imaging module in the related art.

As shown in FIG. 9, an imaging module 10b in the related art includes a carrier 12a and a lens assembly 13a. The lens assembly 13a includes a lens barrel 13b and a lens 13c. The lens 13c is fixed in the lens barrel 13b. The lens assembly 13a is fixed to the carrier 12a through the lens barrel 13b, that is to say, the lens barrel 13b is fixed to the carrier 12a. The carrier 12a is connected to the drive mechanism 15a. The drive mechanism 15a may drive the carrier 12a to move within the housing 11a. The carrier 12a then drives the lens assembly 13a, thus driving the lens 13c to move accordingly to achieve a function of zooming. Since a thickness of the carrier 12a and that of the lens barrel 13b is not ignorable, a considerable part of the space of the imaging module 10b is occupied by the carrier 12a and that of the lens barrel 13b, such that a structure of the imaging module 10b is complicated and has a large volume, thereby affecting a size of the lens 13c arranged in the lens assembly 13a, or an overall size of the imaging module 10b.

As shown in FIG. 6, in the imaging module 10 according to some embodiments of the present disclosure, the lens barrel is removed. The plurality of lenses 13 are directly fixed on the moving element 12, and thus the plurality of lenses 13 and the moving element 12 may be configured as an integrated structure, thereby reducing the thickness of the imaging module 10. In some embodiments, the plurality of lenses 13 and the moving element 12 being configured as an integrated structure does not means that the lenses 13 should be formed together with the moving element 12 in one process. Instead, the lenses 13 may be integrated on the moving element 12 in one-part component, or may be separately arranged on the moving element 12 but capable of moving along with the moving element 12.

Of course, while keeping the size of the original imaging module 10 unchanged, the size of each of the plurality of lenses 13 may also be adaptively enlarged or increased to increase an effective optical aperture of the lens 13 and thus obtain a better optical effect. In some embodiments, it is also possible to keep the size of each of the original optical lens 13 unchanged, but reduce a height of the imaging module 10, such that the number of components of the imaging module 10 may be small. In this way, the structure of the imaging module 10 is simple, and the volume is smaller.

Figure 7:
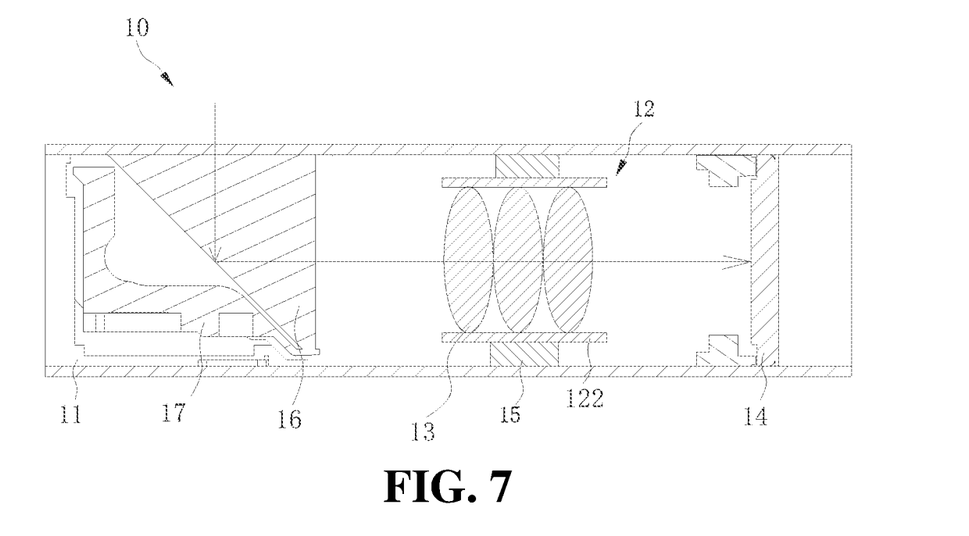
FIG. 7 is a schematic cross-sectional view of an imaging module according to another embodiment of the present disclosure.

As shown in FIG. 6, in some embodiments, the moving element 12 has a cylindrical configuration. The plurality of lenses 13 are fixed in the moving element 12 at intervals along an axial direction of the moving element 12. As shown in FIG. 7, in some embodiments, the moving element 12 includes two clips or clamping plates/sheets 122 spaced apart from each other in a direction substantially perpendicular to the optical axis of the plurality of lenses 13. The plurality of lenses 13 are arranged or sandwiched between the two clips 122.

It can be understood that, since the moving element 12 is configured to fixedly arrange the plurality of spaced-apart lenses 13, a required length of the moving element 12 is relatively large. The moving element 12 may have a cylindrical configuration, a square configuration, and other configurations with a cavity. In this way, the plurality of lenses 13 may be better arranged in the moving element 12 with the cylindrical configuration. Besides, the plurality of lenses 13 may be better protected in the cavity, such that the plurality of lenses 13 are more stabilized and are not easily to be shaken.

In addition, in the case that the moving element 12 includes two clips for holding the plurality of lenses 13 therebetween, not only the plurality of lenses 13 have a certain stability, but also the weight of the moving element 12 may be reduced. A required power for the drive mechanism 15 to drive the moving element 12 is reduced. A design difficulty of the moving element 12 is reduced. The lens 13 is thus easier to be disposed on the moving element 12.

Of course, the moving element 12 is not limited to the above-mentioned cylindrical configuration and the two clips. In other embodiments, the moving element 12 may include three, four or more clips to form a more stable structure; or the moving element may have a simpler structure such as a single clip; or the moving element may have various regular or irregular configurations with a cavity such as a rectangular configuration or a circular configuration to receive the lens 13. On the premise of ensuring the normal imaging and operation of the imaging module 10, specific selections may be made.

The image sensor 14 may be provided from a complementary metal oxide semiconductor (CMOS) photosensitive element or a charge-coupled device (CCD) photosensitive element.

In some embodiments, the plurality of lenses 13 are fixed to the moving element 12 by an adhesive.

The method of fixing the lenses 13 to the moving element 12 by the adhesive is simpler, easy to implement, and has a good fixing effect.

In some embodiments, the plurality of lenses 13 may be fixed in the moving element 12 by a thread. Specifically, the thread adapted to edges of the plurality of lenses 13 may be arranged in the moving element 12. For example, a side of the lens 13 may be sucked by a suction cup, and the plurality of lenses 13 may be screwed into the moving element 12 along the thread. In this way, the operation has a high repeatability and a good stability. A connection structure between the lens 13 and the moving element 12 is not required to be destroyed.

In some embodiments, the drive mechanism 15 is an electromagnetic drive mechanism, a piezoelectric drive mechanism, or a memory-alloy drive mechanism.

Specifically, the electromagnetic drive mechanism includes a magnetic field and a conductor. If the magnetic field moves relative to the conductor, an induced current may be generated in the conductor. The induced current leads to an ampere force upon the conductor, and the conductor thus moves. Herein, the conductor may be a part of the electromagnetic drive mechanism that drives the moving element 12 to move. The piezoelectric drive mechanism is based on an inverse piezoelectric effect of a piezoelectric ceramic material. If a voltage is applied to the piezoelectric material, a mechanical stress is generated, that is, a conversion between an electrical energy and a mechanical energy occurs. A mechanical deformation of the piezoelectric ceramic material is controlled to generate a rotation or a linear movement. The piezoelectric drive mechanism may have advantages of simple structure and low speed.

The drive of the memory-alloy drive mechanism is based on the characteristics of a shape memory alloy. The shape memory alloy is a special alloy. Once the shape memory alloy has memorized any shape, even if the shape memory alloy deforms, the shape memory alloy may recover to the shape before deformation when heated to a certain temperature. In this way, the purpose of driving is achieved with characteristics of rapid displacement and free direction.

As shown in FIG. 6, in some embodiments, the imaging module 10 further includes a light-converting element 16 disposed in the housing 11. The light-converting element 16 is configured to redirect an incident light from an outside of the housing 11, such that the light may further pass through the plurality of lenses 13, and be further transmitted to the image sensor 14.

Further, the light-converting element 16 is a prism or a plane mirror. In an example, when the light-converting element 16 is a prism, the prism may be a triangular prism. The cross-section of the prism is a right-angled triangle. The light is incident from one of the right-angled sides of the right-angled triangle, reflected by the oblique edge, and further emitted out of the prism from the other right-angled side. It can be understood that, of course, the incident light may be emitted out of the prism after being refracted but without being reflected by the prism. The prism may be made of glass, plastic, or other materials with good light transmission. In some embodiments, a reflective material such as silver may be coated on a surface of the prism to reflect the incident light.

It can be understood that when the light-converting element 16 is a plane mirror, the incident light is reflected at the plane mirror to redirect the incident light.

In some embodiments, the imaging module 10 includes a mounting base 17 received in the housing 11, and the light-converting element 16 is fixed on the mounting base 17.

The mounting base 17 is configured to mount the light-converting element 16, or to say, the mounting base 17 is a carrier of the light-converting element 16. The light-converting element 16 is fixedly disposed on the mounting base 17, to maintain the fixed position of the light-converting element 16, which is beneficial for the light-converting element 16 to reflect or refract the incident light. The light-converting element 16 may be fixed on the mounting base 17 by an adhesive to be fixedly connected with the mounting base 17.

In some embodiments, the mounting base 17 may be rotated relative to the housing 11 to adjust the light-converting element 16, thereby redirecting the incident light, such that the imaging module 10 may achieve an optical stabilization.

Specifically, the mounting base 17 may be movably disposed in the housing 11, and be rotated relative to the housing 11, such that the direction of the incident light redirected by the light-converting element 16 may be adjusted, and the imaging module 10 may achieve the optical stabilization. When the imaging module 10 captures images, if the imaging module 10 shakes, the image sensor 14 cannot obtain a stable image, and the quality of the formed image is poor. The mounting base 17 may drive the light-converting element 16 to rotate in a direction opposite to the shaking of the imaging module 10, thereby compensating the incident deviation of the incident light and achieving the effect of the optical stabilization. The mounting base 17 may be connected to the drive mechanism 15, and the drive mechanism 15 may drive the mounting base 17 to rotate.

In some embodiments, the imaging module 10 includes the housing 11, the moving element 12, the lenses 13, the image sensor 14, the drive mechanism 15, the light-converting element 16, and the mounting base 17. The moving element 12, the lenses 13, the drive mechanism 15, the light-converting element 16, and the mounting base 17 are all disposed in the housing 11. The light-converting element 16 is disposed on the mounting base 17. The lens 13 is received in the moving element 12. After the incident light enters the housing 11, the incident light is redirected by the light-converting element 16, and then reaches the image sensor 14 after passing through the lens 13, such that the image sensor 14 obtains an external image.

The lens 13 is received in the moving element 12. Furthermore, the moving element 12 is disposed between the light-converting element 16 and the image sensor 14, and spaced apart from the light-converting element 16 and the image sensor 14. The lens 13 is configured to image the incident light on the image sensor 14. The image sensor 14 may then obtain a better quality image.

When the moving element 12 drive the lenses 13 to move along the optical axis of the lenses 13 as a whole, an image may be formed on the image sensor 14, thereby enabling the imaging module 10 to focus. The imaging module 10 may include a plurality of lenses 13. At least one of the plurality of lenses 13 may be disposed or received in the moving element 12, and the remaining of the plurality of lenses 13 may be disposed in the housing 11 and outside the moving element 12. In this case, when at least one of the plurality of lenses 13 received in the moving element 12 moves relative to other lenses 13 outside the moving element 12, an overall focal length of the imaging module 10 changes, thereby achieving a function of zooming of the imaging module 10.

Figure 8:
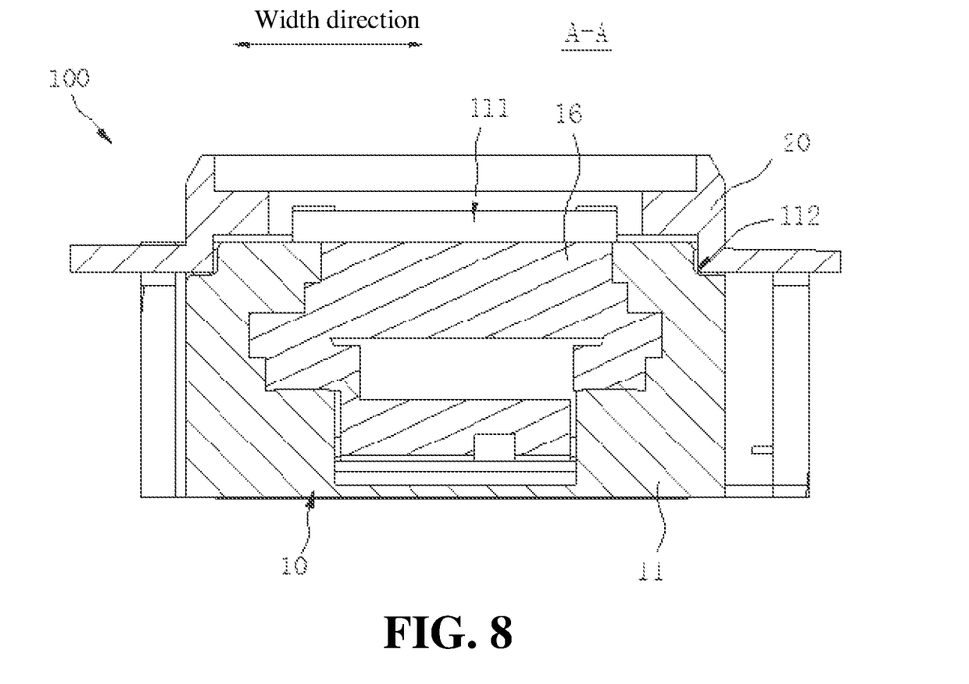
FIG. 8 is a schematic cross-sectional view of the camera assembly taken along line A-A shown in FIG. 2.

As shown in FIG. 5 and FIG. 8, the camera assembly 100 according to some embodiments of the present disclosure includes the imaging module 10 of any one of the foregoing embodiments. A light inlet 111 is defined in the housing 11. The imaging module 10 further includes the light-converting element 16 disposed in the housing 11. The light-converting element 16 is configured to redirect the incident light from the light inlet 111, such that the light may further pass through the plurality of lenses 13, and be further transmitted to the image sensor 14.

In an example, the light-converting element 16 redirects the incident light from the light inlet 111 by an angle of 90 degrees. For example, an incident angle of the incident light on an emission surface of the light-converting element 16 is 45 degrees, and a reflection angle is also 45 degrees. Of course, the light-converting element 16 may also redirect the incident light by other angles, such as 80 degrees, 100 degrees, or the like, as long as the incident light can be redirected to reach the image sensor 14.

In some embodiments, it is possible to provide one light-converting element 16. At this time, the incident light is transmitted to the image sensor 14 after one redirecting. In other embodiments, it is possible to provide one a plurality of light-converting elements 16. At this time, the incident light is transmitted to the image sensor 14 after at least twice redirecting.

Figure 2:
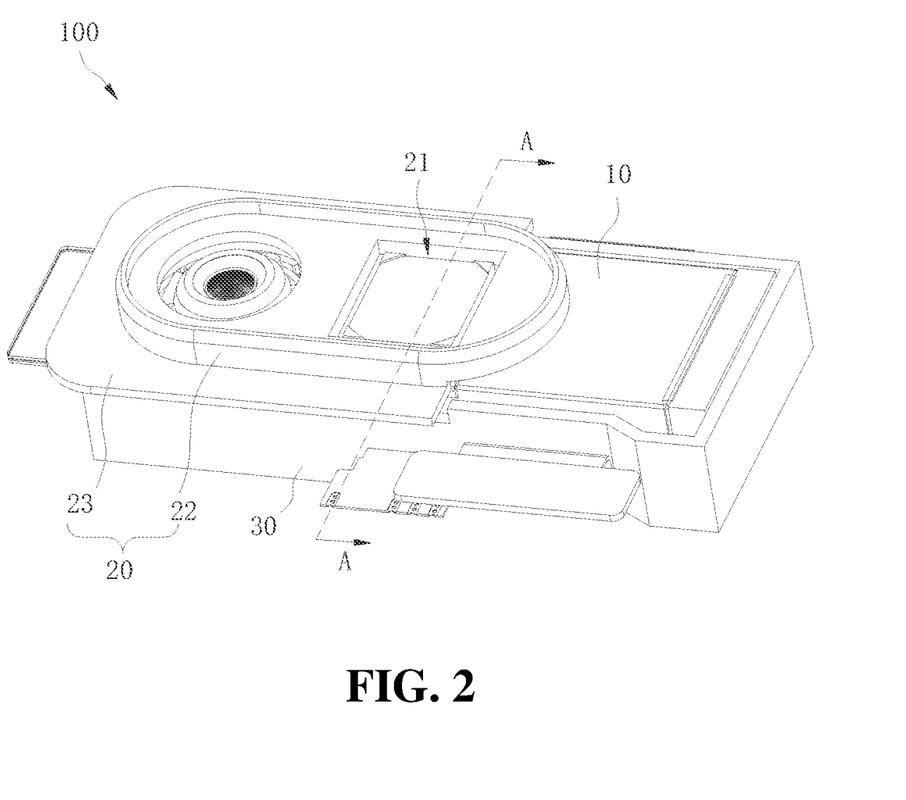
FIG. 2 is a schematic perspective view of a camera assembly according to an embodiment of the present disclosure.
Figure 11:
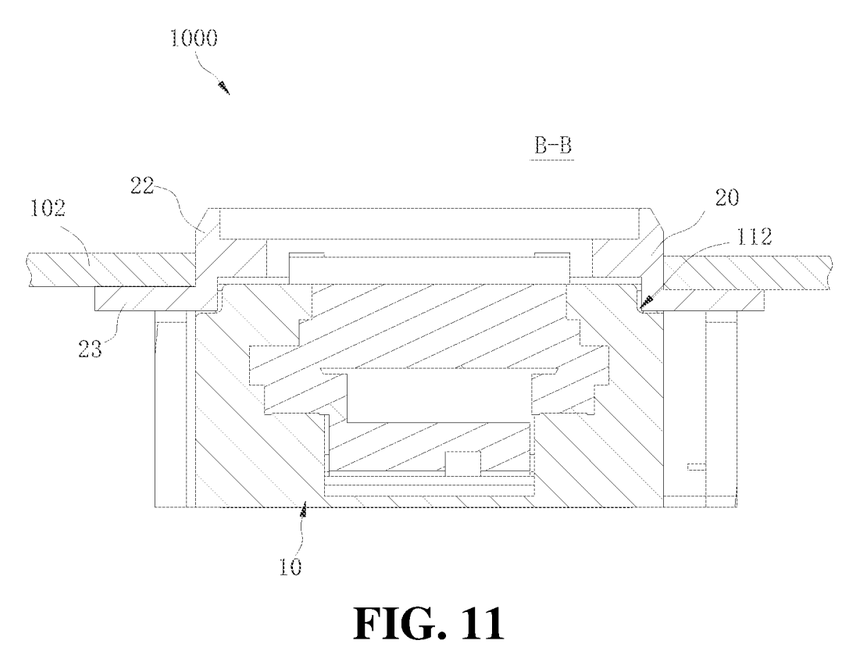
FIG. 11 is a schematic cross-sectional view of the electronic device taken along line B-B shown in FIG. 1.

As shown in FIGS. 2, 8 and 11, in some embodiments, in a width direction of the imaging module 10, the housing 11 defines a groove 112 on a side defining the light inlet 111. The camera assembly 100 further includes a decoration member 20. The decoration member 20 is disposed over the light inlet 111, and partially inserted into the groove 112. The decoration member 20 defines a through hole 21. The light inlet 111 is exposed to the outer side of the decoration member 20 through the through hole 21. The imaging module 10 collects external images through the through hole 21.

The housing 11 substantially has a square configuration. The housing 11 defines a light inlet 111. The incident light enters the imaging module 10 through the light inlet 111. That is, the light-converting element 16 is configured to redirect the incident light from the light inlet 111 to the image sensor 14. Therefore, it can be understood that the imaging module 10 is a periscope lens module. Compared with vertical lens modules, the height of the periscope lens module is smaller, such that the overall thickness of the electronic device 1000 may be reduced. In the vertical lens module, the optical axis of the lens module is a straight line, or to say, the incident light is transmitted to a photosensitive device of the lens module along the direction of a linear optical axis.

It can be understood that the decoration member 20 may be disposed on the casing 102 and protrude out of a surface of the casing 102. The light inlet 111 is exposed through the through hole 21 to allow the external light to pass through the through hole 21 and then enter the imaging module 10 from the light inlet 111.

The decoration member 20 may be made of a metal material. For example, the material of the decoration member 20 may be a stainless steel. The decoration member 20 may be processed by a polishing process to form a bright surface, such that the decoration member 20 may have a better appearance.

As shown in FIG. 8, in some embodiments, in a width direction of the imaging module 10, the housing 11 defines a groove 112 at a side defining the light inlet 111. The decoration member 20 is disposed over the light inlet 111, and partially inserted into the groove 112.

Figure 10:
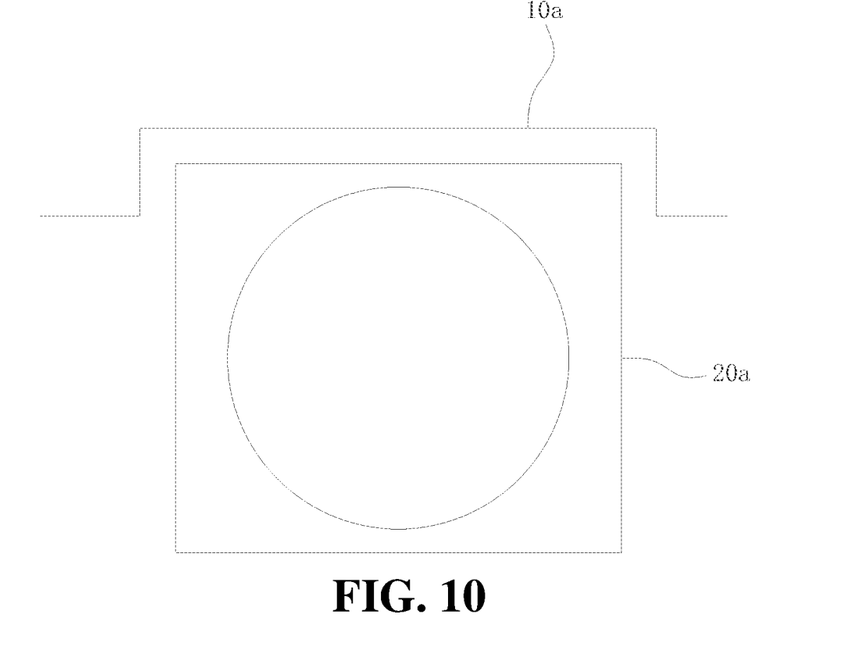
FIG. 10 is a schematic structural view of a cooperation between an imaging module and a decoration member according to some embodiments.

As shown in FIG. 10, if the groove 112 is omitted, a periscope imaging module 10a is partially extended into the decoration member 20a in the width direction to make the overall thickness of the electronic device small. Since the width of the periscopic imaging module 10a is greater than that of the vertical imaging module 10a, the width of the decoration member 20a may be greater at this time, which is not good for the aesthetics of the electronic device, and also makes the electronic device not compact enough.

In some embodiments, the groove 112 is defined at a side of the housing 11 with the light inlet 111. The decoration member 20 is disposed over the light inlet 111, and partially inserted into the groove 112. In this way, the width of the decoration member 20 is smaller, and the overall height dimension of the camera assembly 100 may also be reduced, thereby facilitating the compactness and miniaturization of the camera assembly 100.

Figure 3:
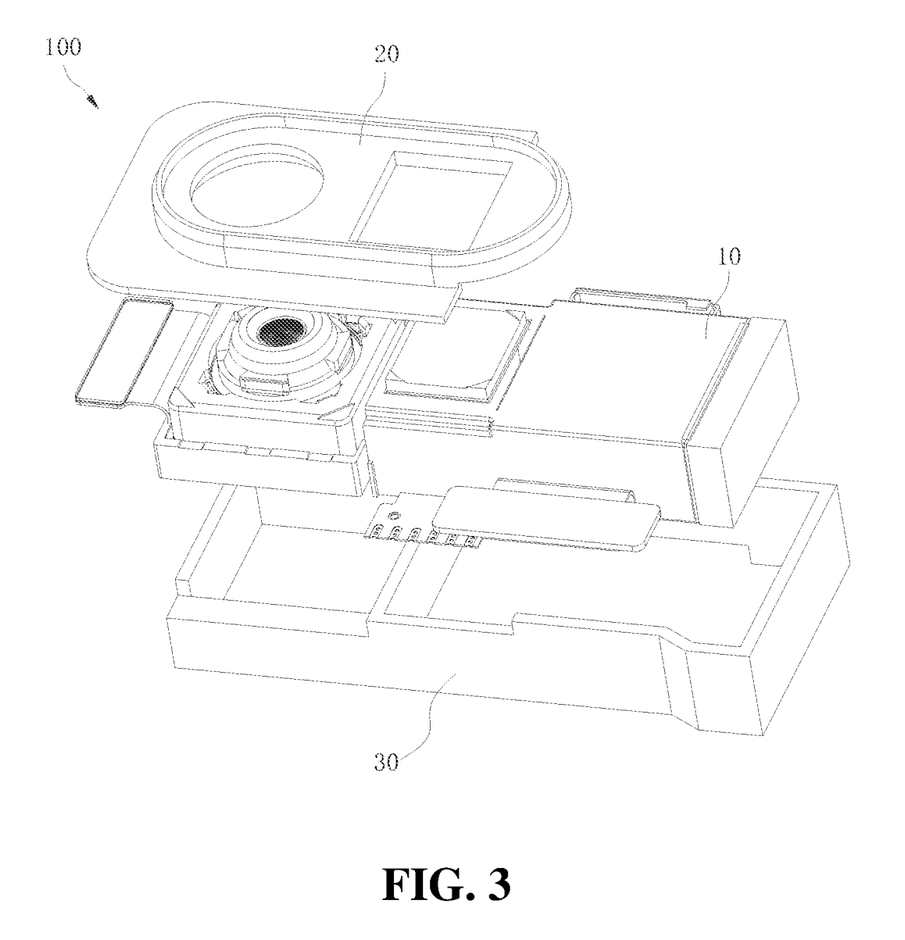
FIG. 3 is an exploded view of the camera assembly according to an embodiment of the present disclosure.
Figure 4:
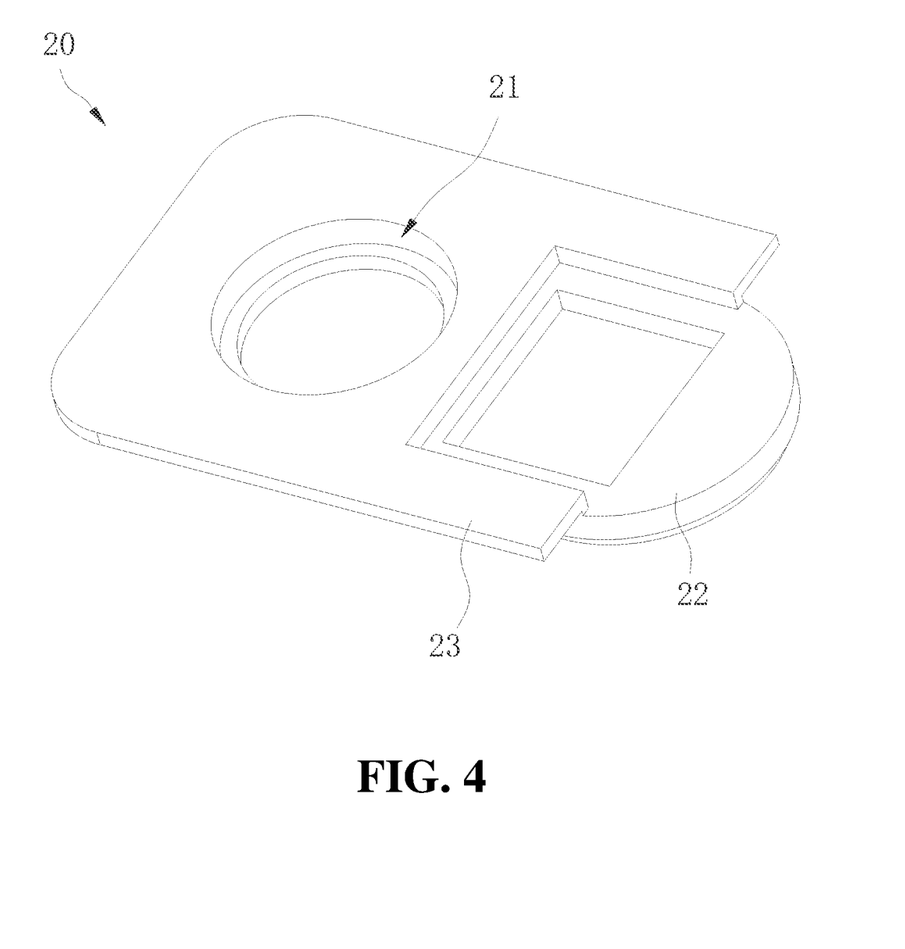
FIG. 4 is a schematic perspective view of a decoration member according to an embodiment of the present disclosure.

As shown in FIGS. 3-5, in some embodiments, the housing 11 includes a top wall 113 and a side wall 114 extending from a side edge 1132 of the top wall 113. The light inlet 111 is defined on the top wall 113. The groove 112 is defined at a junction between the top wall 113 and the side wall 114. The decoration member 20 is abutted on the top wall 113.

The light inlet 111 is defined on the top wall 113. The groove 112 is defined at a junction between the top wall 113 and the side wall 114. The decoration member 20 is abutted on the top wall 113. In this way, the groove 112 is easy to be defined, thereby facilitating the manufacture of the housing 11. In an example, the groove 112 is a profile of the housing 11, that is, the groove 112 may be formed by stamping.

In an example, the decoration member 20 may include a decoration ring 22 in shape of a ring, as shown in FIGS. 3-4. A part of a bottom of the decoration ring 22 is received in the groove 112. A part of the decoration ring 22 is abutted on the top wall 113. In other words, the decoration ring 22 and the housing 11 form a complementary structure. The decoration ring 22 and the housing 11 are fitted to each other or engaged with each other to make the fitting structure of the decoration member 20 and the housing 11 more compact.

In some embodiments, the groove 112 has an elongated configuration. The groove 112 extends along the length direction of the imaging module 10. In some embodiments, the groove 112 has an arc configuration, and surrounds the light inlet 111.

In this way, the groove 112 fits more compactly with the decoration member 20. In some embodiments, the groove 112 has an arc configuration, and surrounds the light inlet 111. Of course, in other embodiments, the structure and shape of the groove 112 are not limited to those described in the above examples, as long as the decoration member 20 and the first imaging module 10 form a complementary structure to reduce the size of the decoration member 20.

In some embodiments, the number of the side walls 114 is two. The top wall 113 includes two side edges 1132 opposite to each other. Each side wall 114 extends from a corresponding side edge 1132. The junctions between each side wall 114 and the corresponding side edge 1132 of the top wall 113 defines a groove 112.

In other words, the side walls 114 are respectively connected to opposite sides of the top wall 113. In some embodiments, the junction between each side wall 114 and the top wall 113 defines a groove 112. In other words, the number of the grooves 112 is two. Of course, in some embodiments, the number of the grooves 112 may also be one, that is, of the junction between one of the side walls 114 and the top wall 113 defines a groove 112.

As shown in FIG. 4 and FIG. 5, in some embodiments, the decoration member 20 may include the decoration ring 22 and a protruding edge 23 extending from the bottom of the decoration ring 22 in a direction away from the decoration ring 22. A part of the bottom of the decoration ring 22 is received in the groove 112. A part of the decoration ring 22 is abutted on the top wall 113.

The decoration ring 22 defines the through hole 21. The through hole 21 penetrates or runs through the decoration ring 22 and the protruding edge 23. The decoration ring 22 is mounted on the casing 102. The protruding edge 23 is abutted on the casing 102. In this way, the protruding edge 23 may restrict the position of the decoration member 20 and reduce the possibility that the decoration member 20 moves outside the casing 102. In an example, during the assembly of the decoration member 20, the decoration member 20 is inserted outward from the inner side of the casing 102. When the protruding edge 23 is abutted on the inner surface of the casing 102, the decoration member 20 is mounted to a predetermined position. The decoration member 20 may be fixed on the casing 102 by an adhesive, or the decoration member 20 may be connected to the casing 102 by an interference fit, such that the decoration member 20 will not be easy to fall off from the casing 102.

The decoration member 20 may be an integrally formed structure by the decoration ring 22 and the protruding edge 23. For example, the decoration member 20 may be manufactured by cutting. In addition, the decoration ring 22 and the protruding edge 23 may also be separate structures, or to say, the decoration ring 22 and the protruding edge 23 may be formed as two independent components firstly, and then be assembled together by welding or other processes to form the decoration member 20.

It should be noted that, in other embodiments, the protruding edge 23 may be omitted. That is, in some embodiments, the decoration member 20 may include only the decoration ring 22.

As shown in FIG. 3, the camera assembly 100 includes the decoration 20, the imaging module 10, and a bracket 30. The imaging module 10 is disposed in the casing 102. The imaging module 10 is disposed near or close to or adjacent to the decoration member 20. The imaging module 10 is disposed in the bracket 30 and is fixedly connected to the bracket 30. The decoration member 20 is disposed above the bracket 30. Specifically, the decoration member 20 may be abutted on the bracket 30 or may be disposed at a distance from or spaced apart from the bracket 30. The bracket 30 may reduce the impact received by the imaging module 10 and increase the life of the imaging module 10.

The decoration member 20 defines the through hole 21. The imaging module 10 may be exposed out of the decoration member 20 from the through hole 21, or in other words, the imaging module 10 collects external images through the through hole 21. Specifically, in some embodiments, the through hole 21 may be a circular hole. In other embodiments, the shape of the through hole 21 is not limited to the shape shown in the accompanying drawings. For example, it could be a square hole.

In the description of this specification, the description with reference to the terms of "an embodiment", "some embodiments", "exemplary embodiments", "examples", "specific examples", or "some examples" and the like means that a combination with specific features, structures, materials, or characteristics described in the embodiments or examples are included in at least one embodiment or example of the present disclosure. In this specification, the schematic expressions of the above terms do not necessarily refer to the same implementation or example. Furthermore, the particular features, structures, materials, or characteristics described may be combined in any suitable manner of any one or more implementations or examples.

Although the embodiments of the present disclosure have been shown and described, those of ordinary skill in the art can understand that various changes, modifications, replacements and variations can be made to these embodiments without departing from the principles and spirit of the present disclosure. The scope of the application is defined by the claims and their equivalents.

What is claimed is:

1. A camera assembly, comprising:
   an imaging module, comprising:
   a housing, defining a light inlet;
   a moving element, movably received in the housing;
   a plurality of lenses, arranged on the moving element and movable along with the moving element;
   an image sensor, disposed at a side of the plurality of lenses;
   a light-converting element, disposed in the housing and configured to redirect an incident light from the light inlet of the housing, such that the incident light passes through the plurality of lenses and is further transmitted to the image sensor;
   a mounting base, received in the housing, fixed to the light-converting element, and being rotatable relative to the housing to adjust the light-converting element to redirect the incident light; and
   a drive mechanism, connecting to the housing and the moving element, wherein the drive mechanism is configured to drive the moving element to move along an optical axis of the plurality of lenses such that the plurality of lenses perform focusing and imaging on the image sensor; wherein the housing defines a groove on a side with the light inlet in a width direction of the imaging module; and
   a decoration member, disposed over the light inlet and partially inserted into the groove; wherein the decoration member defines a through hole; the light inlet is exposed to an outside of the imaging module through the through hole, and the imaging module collects external images through the through hole;
   wherein the housing comprises a top wall and a side wall extending from a side of the top wall, the light inlet is defined on the top wall, the groove is defined at a junction between the top wall and the side wall, and the decoration member is abutted on the top wall;
   wherein a number of the side walls is two, and the top wall comprises two side edges opposite to each other; each side wall extends from one of the side edges correspondingly; and a junction between each side wall and the top wall defines the groove.

2. The camera assembly according to claim 1, wherein the moving element has a substantially cylindrical configuration, and the plurality of lenses are fixed in the moving element at intervals along an axial direction of the moving element; or
   the moving element comprises two clips, and the plurality of lenses are sandwiched between the two clips.

3. The camera assembly according to claim 1, wherein the plurality of lenses are adhered to the moving element by an adhesive or by a thread.

4. The camera assembly according to claim 1, wherein the drive mechanism is an electromagnetic drive mechanism, a piezoelectric drive mechanism, or a memory alloy drive mechanism.

5. The camera assembly according to claim 1, wherein the moving element is disposed between the light-converting element and the image sensor and spaced apart from the light-converting element and the image sensor along an optical axis of the plurality of lenses.

6. The camera assembly according to claim 5, wherein the light-converting element comprises a prism or a plane mirror.

7. A camera assembly, comprising:
   an imaging module, comprising:
   a housing, defining a light inlet;
   a moving element, received in the housing;
   a plurality of lenses, contacting with and fixed on the moving element;
   an image sensor, disposed at a side of the plurality of lenses;
   a drive mechanism, connecting to the housing and the moving element, wherein the drive mechanism is configured to drive the moving element to move along an optical axis of the plurality of lenses such that the plurality of lenses perform focusing and imaging on the image sensor;
   a light-converting element, disposed in the housing and configured to redirect an incident light entering the imaging module from the light inlet, such that the incident light passes through the plurality of lenses and is further transmitted to the image sensor; and
   a mounting base, received in the housing, fixed to the light-converting element, and being rotatable relative to the housing to adjust the light-converting element to redirect the incident light; wherein the housing defines a groove on a side with the light inlet in a width direction of the imaging module; and
   a decoration member, disposed over the light inlet and partially inserted into the groove;
   wherein the decoration member defines a through hole; the light inlet is exposed to an outside of the imaging module through the through hole, and the imaging module collects external images through the through hole;
   wherein the decoration member comprises a decoration ring and a protruding edge extending from a bottom of the decoration ring in a direction away from the decoration ring, and a part of the bottom of the decoration ring is received in the groove and abutted on the top wall.

8. The camera assembly according to claim 7, wherein the housing comprises a top wall and a side wall extending from a side of the top wall, the light inlet is defined on the top wall, the groove is defined at a junction between the top wall and the side wall, and the decoration member is abutted on the top wall.

9. The camera assembly according to claim 8, wherein the groove has a substantially elongated configuration and extends along a length direction of the imaging module; or the groove has a substantially arc configuration and surrounds the light inlet.

10. The camera assembly according to claim 8, wherein a number of the side walls is two, and the top wall comprises two side edges opposite to each other; each side wall extends from one of the side edges correspondingly; and a junction between each side wall and the top wall defines the groove.

11. The camera assembly according to claim 7, wherein the camera assembly further comprises a bracket, the imaging module is disposed in the bracket and fixedly connected to the bracket; the decoration member is disposed above the bracket, and the decoration member is abutted on the bracket; or, the decoration member is disposed at a distance from the bracket.

12. An electronic device, comprising:
a casing; and
a camera assembly disposed on the casing, wherein the camera assembly comprises:
an imaging module, comprising:
a housing, defining a light inlet;
a moving element received in the housing;
a plurality of lenses contacting with and fixed on the moving element;
an image sensor, disposed at a side of the plurality of lenses;
a drive mechanism, connecting to the housing and the moving element, wherein the drive mechanism is configured to drive the moving element to move along an optical axis of the plurality of lenses such that the plurality of lenses perform focusing and imaging on the image sensor;
a light-converting element, disposed in the housing and configured to redirect an incident light entering the imaging module from the light inlet, such that the incident light passes through the plurality of lenses and is further transmitted to the image sensor; and
a mounting base, received in the housing, fixed to the light-converting element, and being rotatable relative to the housing to adjust the light-converting element to redirect the incident light;
wherein the decoration member comprises a decoration ring and a protruding edge extending from a bottom of the decoration ring in a direction away from the decoration ring; a part of the bottom of the decoration ring is received in the groove and abutted on the top wall; and the protruding edge is abutted on the casing.

13. The electronic device according to claim 12, wherein the housing defines a groove on a side with the light inlet in a width direction of the imaging module, and the camera assembly further comprises a decoration member; the decoration member is disposed over the light inlet, and partially inserted into the groove; the decoration member defines a through hole; the light inlet is exposed to an outside of the imaging module through the through hole; and the imaging module collects external images through the through hole.

* * * * *